United States Patent
Yie et al.

(10) Patent No.: US 8,861,616 B2
(45) Date of Patent: Oct. 14, 2014

(54) METHODS FOR ENCODING/DECODING OF VIDEO USING COMMON MERGING CANDIDATE SET OF ASYMMETRIC PARTITIONS

(71) Applicant: Humax Co., Ltd., Seongnam-si (KR)

(72) Inventors: Chung Ku Yie, Incheon (KR); Yong Jae Lee, Seoul (KR); Hui Kim, Namyangju-si (KR)

(73) Assignee: Humax Holdings Co., Ltd., Yongin-Si, Gyeonggi-Do (KR)

( * ) Notice: Subject to any disclaimer, the term of this patent is extended or adjusted under 35 U.S.C. 154(b) by 0 days.

(21) Appl. No.: 13/683,771

(22) Filed: Nov. 21, 2012

(65) Prior Publication Data
US 2013/0128978 A1    May 23, 2013

(30) Foreign Application Priority Data

Nov. 23, 2011  (KR) ................. 10-2011-0123209
Feb. 17, 2012  (KR) ................. 10-2012-0016616

(51) Int. Cl.
| H04N 7/18 | (2006.01) |
| H04N 19/583 | (2014.01) |
| H04N 19/119 | (2014.01) |
| H04N 19/51 | (2014.01) |
| H04N 19/61 | (2014.01) |
| H04N 19/436 | (2014.01) |
| H04N 19/56 | (2014.01) |
| H04N 19/96 | (2014.01) |
| H04N 19/46 | (2014.01) |

(52) U.S. Cl.
CPC ... *H04N 19/00733* (2013.01); *H04N 19/00072* (2013.01); *H04N 19/00696* (2013.01); *H04N 19/00781* (2013.01); *H04N 19/00521* (2013.01); *H04N 19/0066* (2013.01); *H04N 19/00969* (2013.01); *H04N 19/00545* (2013.01)
USPC .............. 375/240.26; 375/240.25; 375/240.11

(58) Field of Classification Search
CPC .. H04N 7/50; H04N 7/26335; H04N 7/26707
USPC ........................................ 375/240.01–240.29
See application file for complete search history.

(56) References Cited

U.S. PATENT DOCUMENTS

| 2010/0124273 | A1* | 5/2010 | Divorra Escoda et al. .................. 375/240.01 |
| 2012/0257678 | A1 | 10/2012 | Zhou et al. |
| 2013/0287116 | A1* | 10/2013 | Helle et al. ............... 375/240.24 |

FOREIGN PATENT DOCUMENTS

| JP | 09-084052 A | 3/1997 |
| KR | 10-1033243 B1 | 4/2011 |

(Continued)

OTHER PUBLICATIONS

Ken McCann, "High Efficiency Video Coding (HEVC) Test Model 2 (HM 2) Encoder Description", Jan. 2011.

*Primary Examiner* — Andy Rao
(74) *Attorney, Agent, or Firm* — Lowe Hauptman & Ham, LLP

(57) ABSTRACT

The present invention provides video encoding and decoding methods using block merging, which can be applied to a high resolution video of more than HD (High Definition) resolution. A video encoding method includes partitioning a current block into a first and a second prediction unit by using asymmetric partitioning, constructing a list of common merging candidate blocks including a predetermined number of common merging candidate blocks selected from adjacent blocks of the current block, selecting at least one candidate block from among the list of common merging candidate blocks and sending information of the selected candidate block to a decoder for each of the first and the second prediction unit.

9 Claims, 10 Drawing Sheets

(56) References Cited

FOREIGN PATENT DOCUMENTS

| | | |
|---|---|---|
| KR | 10-2011-0135471 A1 | 12/2011 |
| WO | WO 2009/051719 A2 | 4/2009 |
| WO | WO 2011/128366 A1 | 10/2011 |
| WO | WO 2012/174990 A1 | 12/2012 |
| WO | WO 2013/067938 A1 | 5/2013 |

* cited by examiner

METHODS FOR ENCODING/DECODING OF VIDEO USING COMMON MERGING CANDIDATE SET OF ASYMMETRIC PARTITIONS

CLAIM FOR PRIORITY

This application claims priority to Korean Patent Application No. 2011-0123209 filed on Nov. 23, 2011 and Korean Patent Application No. 2012-0016616 filed on Feb. 17, 2012 in the Korean Intellectual Property Office (KIPO), the entire contents of which are hereby incorporated by reference.

BACKGROUND

1. Technical Field

The present invention relates to encoding and decoding of video and more specifically, video encoding methods, video encoding apparatuses, video decoding methods, and video decoding apparatuses by using block merging.

2. Description of the Related Art

Conventional video compression uses inter prediction and intra prediction techniques designed to remove redundancy between pictures for improving compression efficiency.

Video encoding algorithms based on intra prediction compress a video by removing temporal redundancy between pictures, where motion compensated inter-frame prediction is a typical technique for this purpose.

Motion compensated inter-frame prediction technique generates a motion vector by searching at least one reference picture located before and/or after a current encoding picture for a region similar to a current encoding block. It applies DCT (Discrete Cosine Transform) to residues between the current block and a prediction block obtained from motion compensation by using the generated motion vector. The result of DCT is transmitted after quantization and entropy encoding.

In case of motion compensated inter prediction, motion vector is generated by dividing a picture into a plurality of blocks having a predetermined size and motion compensation is performed by using the generated motion vector. Individual motion parameters for the respective prediction blocks obtained from motion compensation are transmitted to a decoder.

SUMMARY

Since the number of blocks per picture increases in case of high resolution video of more than HD (High Definition) resolution, it is not desirable in the respect of coding efficiency to transmit motion parameters to a decoder for each prediction block as the amount of motion parameters transmitted becomes considerably large.

Example embodiments of the present invention provides video encoding methods and video encoding apparatuses using block merging which can be applied for high resolution videos of more than HD (High Definition) resolution.

Example embodiments of the present invention also provides video decoding methods and video decoding apparatuses using block merging which can be applied for high resolution videos of more than HD resolution.

In some example embodiments, an encoding method according to one example embodiment of the present invention includes constructing a list of common merging candidate blocks including a predetermined number of common merging candidate blocks selected from among adjacent blocks of a current coding unit asymmetrically partitioned into a first and a second prediction unit; and selecting at least one candidate block from among the list of common merging candidate blocks for each of the first and the second prediction unit and sending information of the selected candidate block to a decoder for each of the first and the second prediction unit. The list of common merging candidate blocks may include commonly used merging candidate blocks in case block merging is performed for the first and the second prediction unit. The block merging can be performed only when the size of the current coding unit is 8-by-8. The largest coding unit (LCU) may be divided into a plurality of non-overlapping motion estimation regions. Motion estimation may be performed sequentially on the motion estimation regions within the largest coding unit. The motion estimation can be performed in a parallel fashion for all prediction units belonging to a motion estimation region within the largest coding unit (LCU). According to the size of the motion estimation region, whether to allow parallel merging for prediction units within the motion estimation region by using the common merging candidate blocks can be determined. The parallel merging for all the prediction units within the motion estimation region may be allowed only when the size of the motion estimation region is larger than a predetermined size. To indicate possibility of processing of the parallel merging according to the size of the motion estimation region, a predetermined value according to the size of the motion estimation region may be transmitted in a PPS (Picture Parameter Set) from an encoder to the decoder. In case the current prediction unit and a prediction unit adjacent to the current prediction unit belong to the same motion estimation region, the corresponding adjacent prediction unit is denoted as non-available, whereas in case the current prediction unit and the prediction unit adjacent to the current prediction unit belong to motion estimation regions different from each other, the corresponding adjacent prediction unit is denoted as available. The list of common merging candidate blocks may include a spatial merging candidate block and a temporal merging candidate block. The first and the second prediction unit within the current coding unit utilize a reference picture index of a block, at a predetermined particular position, from among spatial common merging candidate blocks as a reference picture index for temporal motion vector prediction (MVP) of the temporal merging candidate block. The block, at the predetermined particular position, can be rendered executable through parallel processing by using previously encoded adjacent block which can be constructed even before reconstructing a motion parameter of a first PU0 and a second prediction unit PU1 from among blocks included in the list of common merging candidate blocks. The common merging candidate blocks can be predetermined beforehand according to a rule between the encoder and the decoder.

In other example embodiments, an encoding apparatus includes an inter prediction unit configured to construct a list of common merging candidate blocks including a predetermined number of common merging candidate blocks selected from blocks adjacent to a current coding unit, which have been asymmetrically partitioned into a first and a second prediction unit; and configured to select at least one candidate block from the list of common merging candidate blocks for each of the first and the second prediction unit.

In still other example embodiments, a decoding method according to one example embodiment of the present invention includes constructing a list of common merging candidate blocks including a predetermined number of common merging candidate blocks selected from among adjacent blocks of a current coding unit asymmetrically partitioned into a first and a second prediction unit; generating a motion vector on a block basis by reconstructing a motion parameter of a block-merged block by using at least one candidate block selected from the list of common merging candidate blocks for each of the first and the second prediction unit; and performing motion compensation by using the generated motion vector and a reference picture. The common merging candidate blocks of the second prediction unit consist only of adjacent blocks which can be constructed before a motion parameter of the first prediction unit is reconstructed. The block merging can be performed only when the size of the current coding unit is 8-by-8. The largest coding unit (LCU) may be divided into a plurality of non-overlapping motion estimation regions. Motion estimation may be performed sequentially on the motion estimation regions within the largest coding unit. The motion estimation can be performed in a parallel fashion for all prediction units belonging to a estimation region within the largest coding unit (LCU). According to the size of the motion estimation region, whether to allow a parallel merging for prediction units within the motion estimation region by using the common merging candidate blocks can be determined. The parallel merging for all the prediction units within the motion estimation region is allowed only when the size of the motion estimation region is larger than a predetermined size. In case the current prediction unit and a prediction unit adjacent to the current prediction unit belong to the same motion estimation region, the corresponding adjacent prediction unit is denoted as non-available, whereas in case the current prediction unit and the prediction unit adjacent to the current prediction unit belong to motion estimation regions different from each other, the corresponding adjacent prediction unit is denoted as available. The list of common merging candidate blocks may include a spatial merging candidate block and a temporal merging candidate block. The first and the second prediction unit within the current coding unit utilize a reference picture index of a block, at a predetermined particular position, from among spatial common merging candidate blocks as a reference picture index for temporal motion vector prediction (MVP) of the temporal merging candidate block. The block, at the predetermined particular position, can be rendered executable through parallel processing by using previously encoded adjacent blocks which can be constructed even before reconstructing a motion parameter of a first PU0 and a second prediction unit PU1 from among blocks included in the list of common merging candidate blocks.

In still other example embodiments, includes an inter prediction unit configured to construct a list of common merging candidate blocks including a predetermined number of common merging candidate blocks selected from blocks adjacent to a current coding unit asymmetrically partitioned into a first and a second prediction unit; configured to generate a motion vector on a block basis by reconstructing a motion parameter of a block-merged block by using at least one candidate block selected from the list of common merging candidate blocks for each of the first and the second prediction unit; and configured to perform motion compensation by using the generated motion vector and a reference picture.

BRIEF DESCRIPTION OF THE DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Figure 1:
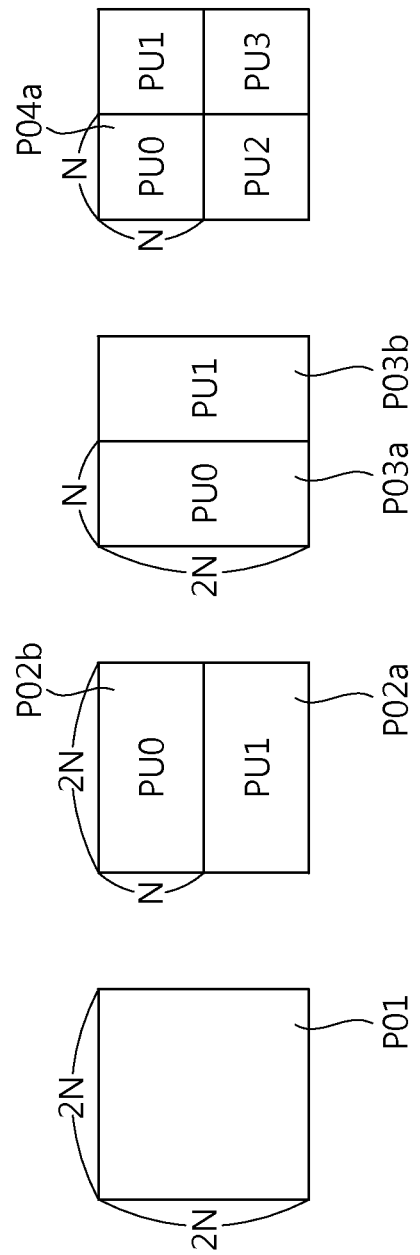
FIG. 1 illustrates symmetric partitioning.

Example embodiments of the present invention can be modified in various ways and various example embodiments of the present invention can be realized; thus, this document illustrates particular example embodiments in the appended drawings and detailed description of the example embodiment will be provided.

However, that is not meant for limiting the present invention to the particular example embodiments; rather, it should be understood to include every possible modification, equivalent, or substitute of the present invention which belongs to the technical principles and scope of the present invention.

Terms such as first, second, and so on can be used for describing various components but the components should not be limited by the terms. The terms are introduced only for the purpose of distinguishing one component from the others. For example, a first component may be called a second component without departing from the scope of the present invention and vice versa. The term of and/or indicates a combination of a plurality of related items described or any one of a plurality of related items described.

If a component is said to be "linked" or "connected" to a different component, the component may be directly linked or connected to the different component but a third component may exist to connect the two components even though the two components may be connected directly. On the other hand, if a component is said to be "linked directly" or "connected directly" to another component, it should be interpreted that there is no further component between the two components.

Terms used in this document have been introduced only to describe particular example embodiment, not intended to limit the scope of the present invention. Singular expression should be interpreted to include plural expressions unless otherwise stated explicitly. Terms such as "include" or "have" are meant to signify existence of embodied characteristics, numbers, steps, behavior, components, modules, and combinations thereof, which should be understood that possibility of existence or addition of one or more characteristics, numbers, steps, behavior, components, modules, and combinations thereof are not precluded beforehand.

Unless otherwise defined, all the terms used in this document, whether they are technical or scientific, possess the same meaning as understood by those skilled in the art to which the present invention belongs. The terms such as those defined in a dictionary for general use should be interpreted to carry the same contextual meaning in the related technology and they should not be interpreted to possess an ideal or excessively formal meaning.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

In what follows, with reference to appended drawings, preferred embodiments of the present invention will be described in more detail. For the purpose of overall understanding of the present invention, the same components of the drawings use the same reference symbols and repeated descriptions for the same components will be omitted.

In one example embodiment of the present invention, encoding and decoding are performed by using recursive coding unit structure to accommodate videos of more than HD (High Definition) resolution.

First, to describe the recursive coding unit structure, it is assumed that each coding unit (CU) is square-shaped and each coding unit (CU) has a variable size of 2N×2N (where the size unit is pixel). Inter prediction, intra prediction, transform, quantization, and entropy encoding may be performed on a CU basis.

The size of a coding unit (LCU) can be represented by powers of two, ranging from 8×8 to 64×64. The coding unit (CU) includes the largest coding unit (LCU) and the smallest coding unit (SCU); for example, the LCU has the size of 64×64 whereas the SCU has the size of 8×8.

The coding unit (CU) has a recursive tree structure. For example, the size $2N0$ of one side of the largest coding unit CU0 may be 64 (N0=32) and the largest layer level or layer depth may be 4. A recursive structure may be represented by using a series of flags. For example, in case the flag value of a coding unit (CUk) is 0 and layer level or layer depth of the coding unit is k, coding for the coding unit (CUk) is performed on a current layer level or depth. In case the flag value is 1, the coding unit (CUk) whose current layer level or depth is k is partitioned into four independent coding units (CUk+1). The layer level or depth of the partitioned coding unit (CUk+1) becomes k+1 and the size of the coding unit (CUk+1) becomes (Nk+1)×(Nk+1). In this case the coding unit (CUk+1) can be represented as a sub-coding unit of the coding unit CUk. The coding unit (CUk+1) is processed recursively until the layer level or depth of the coding unit (CUk+1) reaches the maximum allowable layer level or depth. If layer level or depth of the coding unit (CUk+1) is the same as the maximum allowable layer level or depth, further partitioning is not allowed.

If the hierarchical splitting process as described above is completed, inter prediction or intra prediction is performed for terminal nodes of the coding unit hierarchy tree without further splitting, where the terminal coding unit is used as a prediction unit (PU), which is a base unit for inter prediction or intra prediction.

The terminal coding unit is now partitioned to carry out inter prediction or intra prediction. In other words, partitioning is performed on a prediction unit. Here, a prediction unit (PU) represents the base unit for inter prediction or intra prediction. In other words, a prediction unit is obtained as a terminal node of a coding unit hierarchy tree after the hierarchical splitting process is completed; in other words, size of the prediction unit can take one of 64×64, 32×32, 16×16, and 8×8.

One coding unit (CU), to carry out inter prediction or intra prediction, can be partitioned into prediction units. More specifically, a 2N×2N coding unit can be symmetrically partitioned along horizontal or vertical direction.

FIG. 1 illustrates symmetric partitioning. FIG. 1 assumes that size of a coding unit (CU) is 2N×2N (where N is a natural number and represented by pixel units).

With reference to FIG. 1, in case the prediction mode is inter prediction, a 2N×2N coding unit P01 is symmetrically partitioned in horizontal direction to perform the inter prediction, being partitioned into a partition PU0 (P02b) having size of 2N×N and a partition PU1 (P02a) having size of 2N×N; or a partition PU0 (P03a) of N×2N and a partition PU1 (P03b) of N×2N; or N×N partition PU0 (P04a), PU1, PU2, and PU3.

Figure 2:
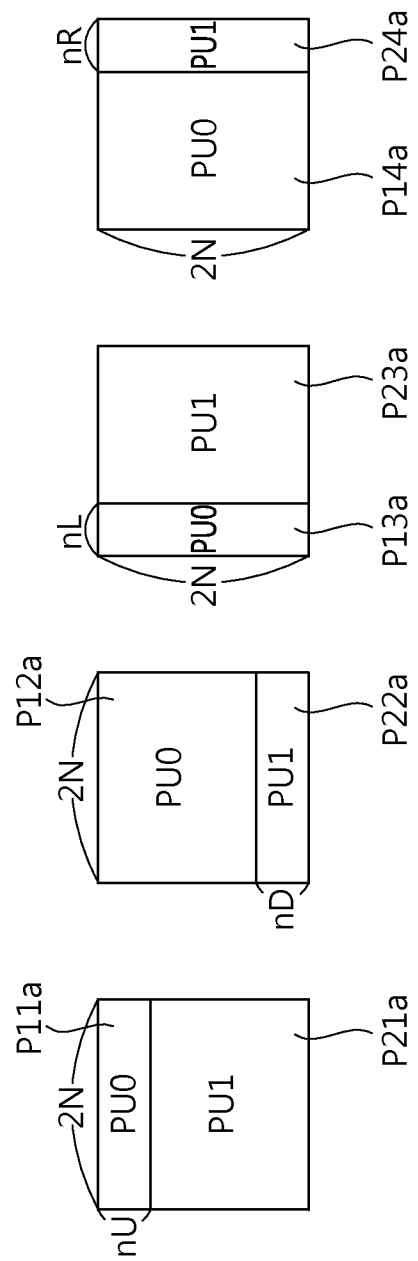
FIG. 2 illustrates asymmetric partitioning.

FIG. 2 illustrates asymmetric partitioning. FIG. 2 assumes that size of a coding unit (CU) 2N×2N (where N is a natural number and represented by pixel units).

With reference to FIG. 2, in case the prediction mode is inter prediction, a 2N×2N coding unit is asymmetrically partitioned in horizontal direction to perform the inter prediction, being partitioned into a partition PU0 (P11a) having size of 2N×nU (where nU is 2N×¼) and a partition PU1 (P12a) having size of 2N×nU (where nU is 2N×¾). Similarly, the 2N×2N coding unit can be asymmetrically partitioned in vertical direction, being partitioned into a partition PU0 (P13a) having size of nL×2N (where nL is 2N×¼) and a partition PU1 (P23a) having size of nR×2N (where nR is 2N×¾); or a partition PU0 (P14a) having size of nL×2N (where nL is 2N×¾) and a partition PU1 (P24a) having size of NR×2N (where nR is 2N×¼).

All the information including motion parameters (a motion vector, a difference value of a motion vector, a reference picture index, a reference picture list, and so on) related to inter prediction is transmitted to a prediction unit, which is a base unit for inter prediction, or a decoder for each of the partitioned prediction units.

In case of a video having more than HD (High Definition) resolution, the number of prediction blocks per picture (prediction unit partitioned or not partitioned) increases; therefore, if motion parameters are transmitted to a decoder for each of prediction blocks (prediction blocks partitioned or not partitioned), the amount of motion parameters to be transmitted gets significantly large, which is not desirable with respect to coding efficiency and therefore a method for improving the coding efficiency is needed.

To solve the problem described above, inter-frame encoding may be performed by using block merging. Block merging is a technique intended for improving coding efficiency. In case blocks adjacent to a current block (or prediction unit) encoded prior to the current block have the same motion parameter (a motion vector, a difference value of the motion vector, a reference picture index, a reference picture list, and so on) as that of the current block X, the adjacent blocks having the same motion parameter as that of the current block X are merged with the current block. Since the same motion parameter of the merged blocks is transmitted to a decoder, the amount of motion parameters to be transmitted to the decoder may be reduced without separately transmitting the motion parameter of the current block, and thus coding efficiency may be improved.

For example, in case a picture is split down to a terminal coding unit in the hierarchy, namely, the smallest coding unit (SCU) and a current block (prediction unit) X, which is the SCU, has the same motion vector as a left-side adjacent block A0 and an upper-side adjacent block B0 encoded previously, block A0, B0, and X are merged and transmitted to a decoder as having the same motion parameters. Here, the motion parameters include a motion vector, a difference value of the motion vector, a reference picture index, a reference picture list, and so on. In this case, a merging flag indicating whether block merging has been applied or not can be transmitted to the decoder.

Figure 3:
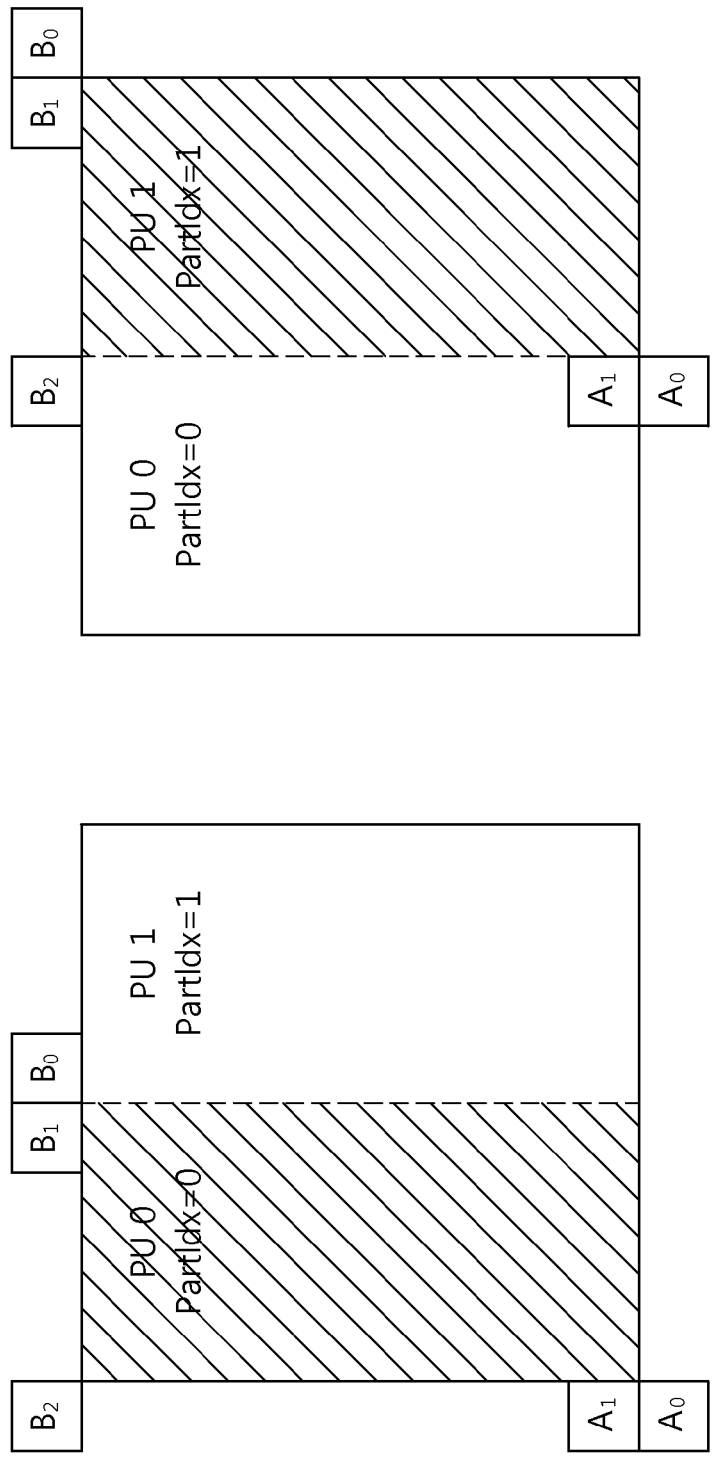
FIG. 3 illustrates block merging of partitioned blocks in case a prediction unit (PU) having size of 2N×2N is partitioned into two N×2N blocks in a vertical direction.
Figure 4:
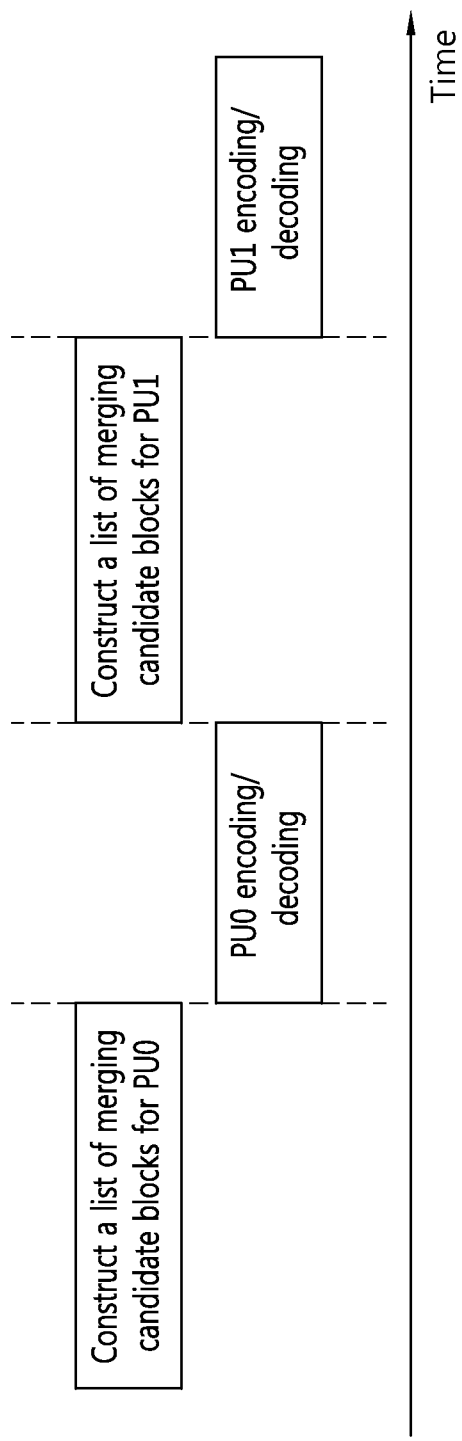
FIG. 4 illustrates a process where block merging of the two partitioned blocks of FIG. 3 and an encoding (or decoding) operation are performed.

FIG. 3 illustrates block merging of partitioned blocks in case a prediction unit (PU) having size of 2N×2N is partitioned into two N×2N blocks in a vertical direction. FIG. 4 illustrates a process where block merging of the two partitioned blocks of FIG. 3 and an encoding (or decoding) operation are performed.

With reference to FIG. 3, a 2N×2N coding unit (CU) is partitioned into a partition block PU0 having size of 2N×N and a partition block PU1 having size of 2N×N.

In what follows, a partitioned block denotes a partitioned prediction unit, functioning as a prediction unit. In the following, PU0 of FIG. 3 is called a first prediction unit while PU1 of FIG. 3 is called a second prediction unit.

In the following, adjacent blocks bordering the left-side boundary of a partition block (prediction unit) are called left-side adjacent blocks. In the left-hand side of FIG. 3, in case of a first prediction unit PU0 filled with oblique lines, A1 belongs to the left-side adjacent blocks while in the right-hand side of FIG. 3, in case of a second prediction unit PU1 filled with oblique lines, A1 belongs to the left-side adjacent blocks. For the first prediction unit PU0 oblique-lined in the left-hand side of FIG. 3, A0 is a block bordering a bottom-side boundary of an adjacent block A1, which is called a bottom-side extension adjacent block while, for the second prediction unit PU1 oblique-lined in the right-hand side of FIG. 3, A0 is a block bordering a bottom-side boundary of an adjacent block Al, which is called a bottom-side extension adjacent block.

Adjacent blocks bordering a top-side boundary of a partition block (prediction unit) are called top-side adjacent blocks. For the oblique lined, first prediction unit PU0 in the left-hand side of FIG. 3, B1 belongs to the top-side adjacent blocks while, for the oblique lined, second prediction unit PU1 in the right-hand side of FIG. 3, B1 belongs to the top-side adjacent blocks. With respect to the oblique lined, first prediction unit PU0 in the left-hand side of FIG. 3, B0 is called a right-hand side extension adjacent block bordering the right-hand side boundary of a top-side adjacent block B1; meanwhile, with respect to the oblique lined, second prediction unit PU1 in the right-hand side of FIG. 3, B0 is called a right-hand side extension adjacent block bordering the right-hand side boundary of a top-side adjacent block B1.

In the left-hand side of FIG. 3, in case of the oblique lined, first prediction unit PU0, B2 borders on the left top-side edge of the first prediction unit PU0 and B2 is called a left top-side adjacent block.

With reference to FIG. 3 again, for the oblique lined, first prediction unit PU0 in the left-hand side of FIG. 3, five adjacent blocks B2, B1, B0, A1, and A0 shown in the left-hand side of FIG. 3 are used as candidate adjacent blocks for block merging, while, for the oblique lined, second prediction unit PU1 in the right-hand side of FIG. 3, five adjacent blocks B2, B1, B0, A1, and AO shown in the right-hand side of FIG. 3 are used as candidate adjacent blocks for block merging.

As shown in the right-hand side of FIG. 3, in case the five adjacent blocks B2, B1, B0, A1, and AO are used as candidate adjacent blocks for block merging with respect to the second prediction unit PU1, the motion parameters of the left-hand side adjacent block A1 cannot be obtained until the motion parameters of the first prediction unit PU0 are reconstructed.

Therefore, as shown in FIG. 3, a process of constructing a list of merging candidate blocks for block merging of the first prediction unit PU0 is first performed and encoding (or decoding) of the first prediction unit is performed and a process of constructing a list of merging candidate blocks for block merging of the second prediction unit PU1 and subsequently encoding (or decoding) of the second prediction unit PU1 is performed.

As a result, it is impossible to carry out parallel processing of the process of constructing a list of merging candidate blocks for block merging of the first prediction unit PU0 and the process of constructing a list of merging candidate blocks for block merging of the second prediction unit PU1.

In what follows, described will be a method for carrying out parallel processing of block merging and an encoding (or decoding) operation for asymmetrically partitioned prediction units according to the example embodiments of the present invention.

Figure 5:
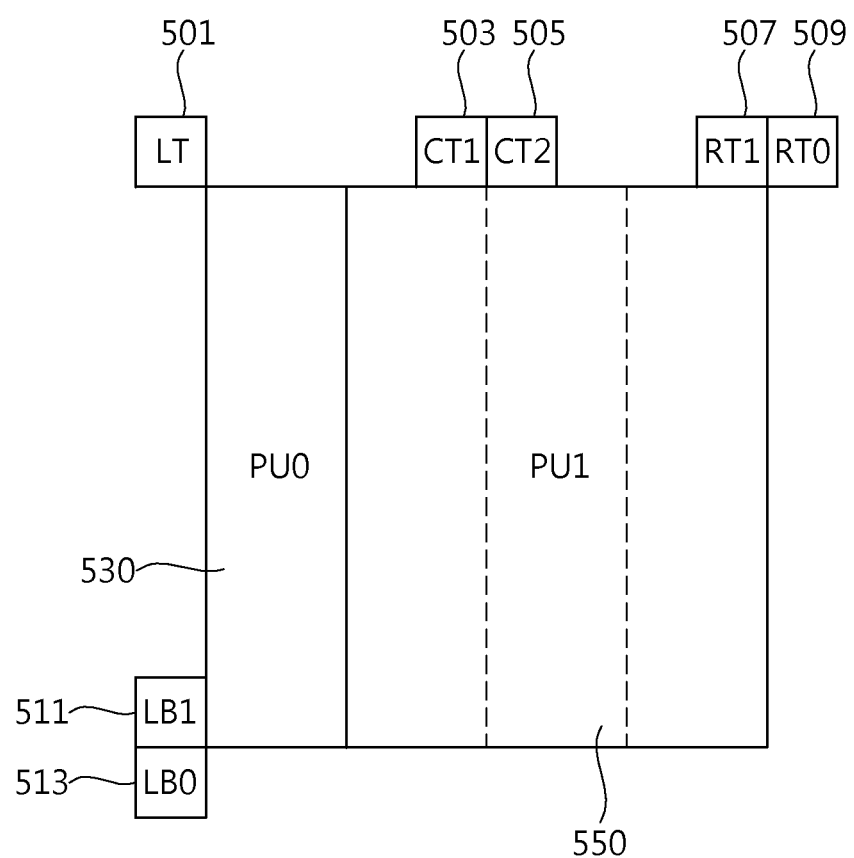
FIGS. 5 to 7 illustrate common merging candidate blocks enabling parallel processing of prediction units PU0, PU1 partitioned asymmetrically according to example embodiments of the present invention.
Figure 6:
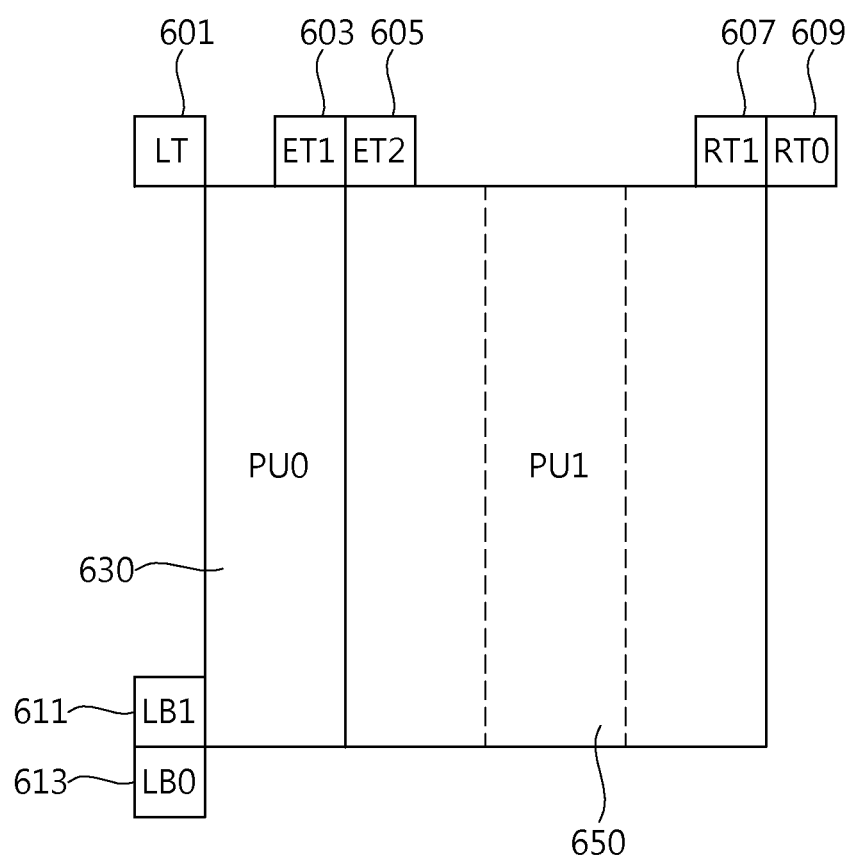
Figure 7:
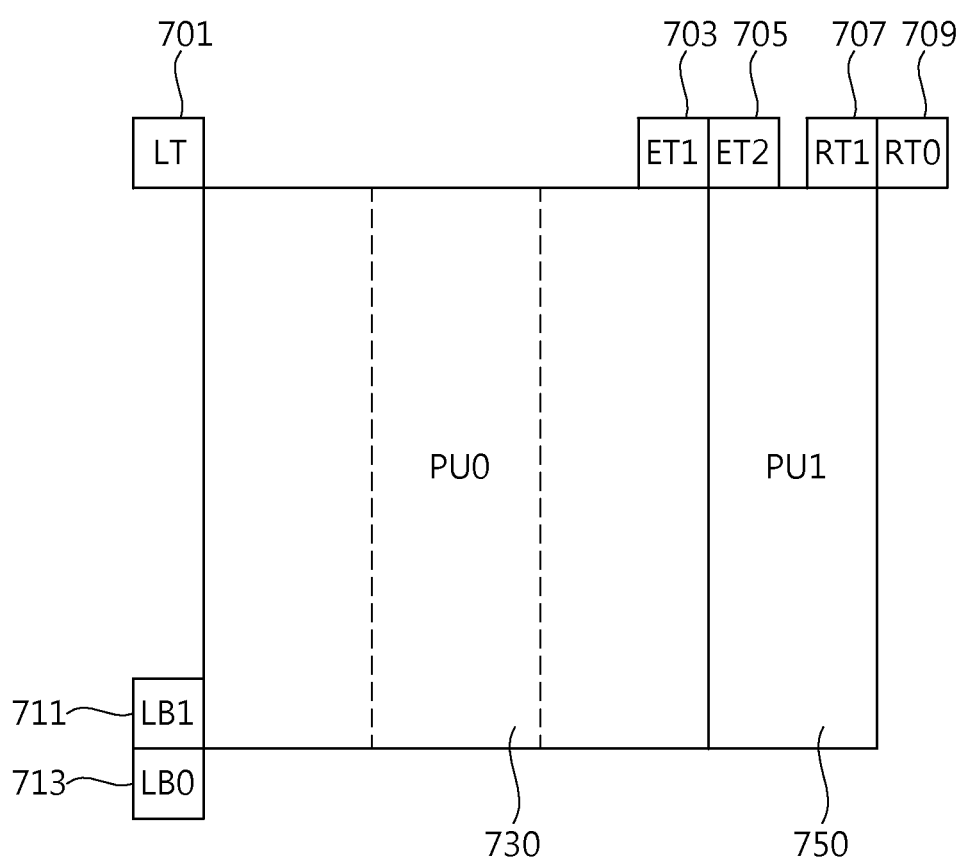
Figure 8:
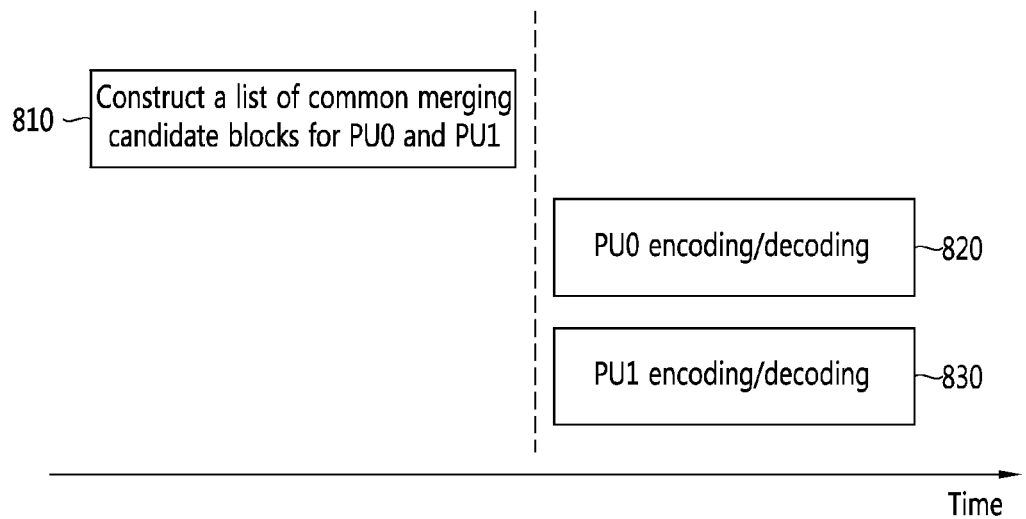
FIG. 8 illustrates a process where block merging of two partitioned blocks in a parallel fashion and an encoding (or decoding) operation are performed.

FIGS. 5 to 7 illustrate common merging candidate blocks enabling parallel processing of prediction units PU0, PU1 partitioned asymmetrically according to example embodiments of the present invention. FIG. 8 illustrates a process where block merging of two partitioned blocks in a parallel fashion and an encoding (or decoding) operation are performed.

First, with reference to FIGS. 5 and 7, a 2N×2N coding unit (CU) is split into partitions consisting of a partition block PU0 (prediction unit) having size of nL×2N (where nL is 2N×¼) and a partition block PU1 (prediction unit) having size of nR×2N (where nR is 2N×¾). In what follows, PU0 of FIGS. 5 to 7 is called a first prediction unit while PU1 is called a second prediction unit. Here, size of a coding unit (CU) is 2N×2N (where N is a positive integer) and N can be one of 2, 4, 8, 16, and 32. A technique of utilizing common merging candidate blocks to enable parallel processing of asymmetrically partitioned prediction units PU0 and PU1 can be applied to all of coding units where N can take a value from among 2, 4, 8, 16, and 32 or can be applied to the coding units where N can assume only one particular value—for example, one from among 2, 4, 8, 15, and 32. In case the largest coding unit (LCU) is 64×64, the smaller the size of the coding unit (CU), the larger becomes the number of constructing a list of common merging blocks including common merging candidate blocks for the entire 64×64 block; in this case, if the common merging candidate list is applied for the case where size of the coding unit (CU) is small rather than the case where size of the coding unit (CU) is large, the number of constructing the common merging candidate list can be significantly reduced, thereby reducing complexity. Meanwhile, if parallel processing is performed by applying much more of the common merging list, performance loss becomes large. Therefore, by taking account both of performance loss and complexity, if the minimum size of a prediction unit (PU) is 4×4, for example, complexity can be reduced a lot without sacrificing performance significantly by employing the common merging candidate blocks only for the case where size of the coding unit (CU) is 8×8 (the smallest number 4 excluding 2 is selected from the N values of 2, 4, 8, 16, and 32).

Meanwhile, the largest coding unit can be split into a plurality of non-overlapping motion estimation regions (or merge estimation regions); motion estimation can be made to be performed sequentially among motion estimation regions within the largest coding unit (LCU) whereas all the prediction units (PUs) belonging to one motion estimation region within the largest coding unit (LCU) can be made to perform motion estimation in a parallel fashion. Here, size of the motion estimation region is smaller than that of the LCU and the motion estimation region can have a square shape.

Depending on size of a motion estimation region, it can be determined whether to allow parallel processing of prediction units (PUs) within the motion estimation region by using common merging candidate blocks. For example, suppose size of the smallest prediction unit is 4×4. If size of the motion estimation region is 4×4, a sequential merging operation is applied to all the prediction units within the largest coding unit (LCU). Meanwhile, it can be made such that parallel merging—a technique using common merging candidate blocks to enable parallel processing—is o allowed for all the prediction units (PUs) within the motion estimation region only when the size of the motion estimation region is 8×8 or more.

Depending on size of the motion estimation region as described above, a predetermined value can be included in a PPS (Picture Parameter Set) and transmitted from an encoder to a decoder to indicate possibility of the parallel merging depending on the size of the motion estimation region. The predetermined value can take one of 0, 1, 2, 3, and 4, for example; size of the motion estimation region for each of the predetermined values 0, 1, 2, 3, and 4 can be 4×4, 8×8, 16×16, 32×32, and 64×64, respectively.

if a current prediction unit (PU) and an adjacent prediction unit (PU) belong to the same motion estimation region (in other words, within the same motion estimation region), the corresponding adjacent prediction unit is marked as non-available whereas the current prediction unit and the adjacent prediction unit belong to motion estimation regions different from each other, the corresponding adjacent prediction unit is marked as available; thus, availability of the list of common merging candidate blocks for motion vector estimation can be determined. In case part of common merging candidate blocks adjacent to a current coding unit (CU) having size of 8×8 (adjacent prediction units) is not available, the merging operation described above can be performed by using adjacent common merging candidate blocks available.

For the asymmetrically partitioned, first PU0 and the second prediction unit PU1 shown in FIGS. 5 to 7 according to example embodiments of the present invention, block merging and an encoding (or decoding) operation are processed in a parallel fashion for the first PU0 and the second prediction unit PU1 by using common merging candidate blocks.

Referring to FIG. 5, the common merging candidate blocks for the first PU0 530 and the second prediction unit PU1 550 may include LT, LB1, LB0, RT1, RT0, CT1, and CT2 block. In other words, the list of merging candidate blocks for the first prediction unit PU0 530 includes LT, LB1, LB0, RT1, RT0, CT1, and CT2 block while the list of merging candidate blocks of the second prediction unit PU1 550 includes LT, LB1, LB0, RT1, RT0, CT1, and CT2 block.

The LT1 block is a left-top side adjacent block of the first prediction unit PU0 530; the LB1 block is the bottom-most, left-hand side block located at the lowest position of left-hand side blocks of the first prediction unit PU0; the LB0 block is a lower-side extension adjacent block bordering on the lower-side boundary of the bottom-most, left-hand side adjacent block LB1 of the first prediction unit. The RT1 block is the rightmost, upper-side adjacent block located at the rightmost position of lower-side adjacent blocks (CT2, RT1) of the second prediction unit PU1 550; RT0 block is a right-hand side extension adjacent block bordering on the right-side boundary of the rightmost, upper-side adjacent block RT1. Among upper-side adjacent blocks of the first PU0 and the second prediction unit PU1, the CT1 and the CT2 block are upper-side, central adjacent blocks located in the left-hand and right-hand side of an extension of a central line formed when un-partitioned prediction unit PU is split into halves in vertical direction. Here, the CT1 block which is an upper-side adjacent block and bordering on the central line between the first prediction unit PU0 and the second prediction unit PU1 in the left-hand side is defined as a first upper-side central adjacent block while the CT2 block which is an upper-side adjacent block and bordering on the central line between the first prediction unit PU0 and the second prediction unit PU1 in the right-hand side is defined as a second upper-side central adjacent block.

The list of merging candidate blocks of the first prediction unit PU0 530 includes seven blocks: LT, LB1, LB0, RT1, RT0, CT1, and CT2. The list of merging candidate blocks of the second prediction unit PU1 550 includes the same seven blocks: LT, LB1, LB0, RT1, RT0, CT1, and CT2. Also, the LT, LB1, LB0, RT1, RT0, CT1, and CT2 block included in the list of merging candidate blocks of the second prediction unit PU1 550 includes only adjacent blocks which can be constructed even before reconstructing motion parameters of the first prediction unit PU0.

Also, since LT, LB1, LB0, CT1, and CT2 block among common merging candidate blocks coincide with the candidate merging blocks of the first prediction unit PU0 of FIG. 3, the same performance can be actually secured compared with a case where block merging of the first prediction unit PU0 is applied.

Therefore, as shown in FIG. 8, a first process constructing a list of merging candidate blocks (LT, LB1, LB0, RT1, RT0, CT1, and CT2 block) for block merging of the first prediction unit PU0 and a second process constructing a list of merging candidate blocks (LT, LB1, LB0, RT1, RT0, CT1, and CT2 block) for block merging of the second prediction unit PU1 are not performed separately but can be performed as a single process 810 constructing a single common merging candidate block; and an encoding (or decoding) process 830 for the second prediction unit PU1 can be performed in parallel with the encoding (or decoding) process 820 for the first prediction unit PU1, thereby reducing encoding time considerably.

The common merging candidate blocks can be predetermined beforehand according to a rule between an encoder and a decoder; in this case, information about the common merging candidate blocks doesn't have to be transmitted from the encoder to the decoder.

FIG. 6 illustrates common merging candidate blocks enabling parallel processing of prediction units PU0, PU1 partitioned asymmetrically according to another example embodiment of the present invention.

As shown in FIG. 6, the list of common merging candidate blocks include seven blocks of LT 601, LB1 611, LB0 613, RT1 607, RT0 609, ET1 603, ET2 605. Different from FIG. 4, the first upper-side central adjacent block CT1 and the second upper-side central adjacent block CT2 are in the list; instead ET1 and ET2 are newly included in the list, which is different from the example embodiment of FIG. 5.

Since the remaining LT, LB1, LB0, RT1, and RT0 block are the same as FIG. 5, detailed descriptions will be omitted.

Among upper-side adjacent blocks of the first PU0 and the second prediction unit PU1, the ET1 and ET2 block are upper-side central adjacent blocks located in the left-hand and right-hand side of an extension of a boundary line (which corresponds to a line dividing a non-partitioned prediction unit (PU) into a quarter in vertical direction) between the first PU0 and the second prediction unit PU1. Here, The ET1 block, which is an upper-side adjacent block and bordering on the boundary line between the first PU0 and the second prediction unit PU1 in the left-hand side is defined as a first upper-side edge-adjacent block while the ET2 block, which is an upper-side adjacent block and bordering on the boundary line between the first PU0 and the second prediction unit PU1 in the right-hand side is defined as a second upper-side edge-adjacent block. In other words, the ET1 block is the rightmost, upper-side adjacent block located at the rightmost position among upper-side adjacent blocks (LT, . . . , ET1) of the first prediction unit PU0 while the ET2 block is the leftmost, upper-side adjacent block located at the leftmost position among upper-side adjacent blocks (ET2, RT1) of the second prediction unit PU1.

Also, in a yet another example embodiment of the present invention, in case a 2N×2N coding unit (CU) is partitioned in vertical direction into a partition block PU0 (prediction unit) having size of nL×2N (where nL is 2N×¾) and a partition block PU1 (prediction unit) having size of nR×2N (where nR is 2N'¼), common merging candidate blocks can be constructed as shown in FIG. 7.

Referring to FIG. 7, the common merging candidate blocks for the first PU0 730 and the second prediction unit PU1 750 may include LT, LB1, LB0, RT1, RT0, ET1, and ET2 block. In other words, the list of merging candidate blocks of the first prediction unit PU0 730 includes LT, LB1, LB0, RT1, RT0, ET1, and ET2 block while the list of merging candidate blocks of the second prediction unit PU1 750 includes LT, LB1, LB0, RT1, RT0, ET1, and ET2 block.

The LT1 block is a left-top side adjacent block of the first prediction unit PU0 530; the LB1 block is the bottom-most, left-hand side block located at the lowest position of left-hand side blocks of the first prediction unit PU0; the LB0 block is a lower-side extension adjacent block bordering on the lower-side boundary of the bottom-most, left-hand side adjacent block LB1 of the first prediction unit. The RT1 block is the rightmost, upper-side adjacent block located at the rightmost position of lower-side adjacent blocks (ET2, RT1) of the second prediction unit PU1 750; The RT0 block is a right-hand side extension adjacent block bordering on the right-side boundary of the rightmost, upper-side adjacent block RT1. The ET1 and ET2 block are upper-side central adjacent blocks located in the left and right-hand side of an extension of a boundary line (which corresponds to a line dividing a non-partitioned prediction unit (PU) into three fourths in vertical direction) between the first PU0 and the second prediction unit PU1 among upper-side adjacent blocks of the first PU0 and the second prediction unit PU1. Here, the ET1 block, which is an upper-side adjacent block bordering on the boundary line between the first PU0 and the second prediction unit PU1 in the left-hand side, is defined as a first upper-side edge-adjacent block while the ET2 block, which is an upper-side adjacent block bordering on the boundary line between the first PU0 and the second prediction unit PU1 in the right-hand side, is defined as a second upper-side edge-adjacent block. in other words, the ET1 block is the rightmost, upper-side adjacent block located in the rightmost position among upper-side adjacent blocks (LT, . . . , ET1)of the first prediction unit PU0 while the ET2 block is the leftmost, upper-side adjacent block located at the leftmost position among upper-side adjacent blocks (ET2, RT1) of the second prediction unit PU1.

The list of merging candidate blocks of the first prediction unit PU0 730 includes seven blocks: LT, LB1, LB0, RT1, RT0, ET1, and ET2. The list of merging candidate blocks of the second prediction unit PU1 750 includes the same seven blocks: LT, LB1, LB0, RT1, RT0, ET1, and ET2. Also, the LT, LB1, LB0, RT1, RT0, ET1, and ET2 block included in the list of merging candidate blocks of the second prediction unit PU1 750 includes only adjacent blocks which can be constructed even before reconstructing motion parameters of the first prediction unit PU0.

Therefore, as shown in FIG. 8, a first process constructing a list of merging candidate blocks (LT, LB1, LB0, RT1, RT0, ET1, and ET2 block) for block merging of the first prediction unit PU0 and a second process constructing a list of merging candidate blocks (LT, LB1, LB0, RT1, RT0, ET1, and ET2 block) for block merging of the second prediction unit PU0 are not performed separately but can be performed as a process 810 constructing a first common merging candidate block; and an encoding (or decoding) process 830 for the second prediction unit PU1 can be performed in parallel with the encoding (or decoding) process 820 for the first prediction unit PU1, thereby reducing encoding time considerably.

Although not shown in the figure, in case of asymmetric partitioning into the first PU0 and the second prediction unit PU1 along vertical direction, particular candidate blocks (at least one from among LB0, ET1, ET2, RT0 and RT1) may be omitted from among the seven common merging candidate blocks.

Although the list of common merging candidate blocks in FIGS. 5 to 7 contains seven blocks, the number of blocks included in the list of common merging candidate blocks is not limited to the above example and the list can be constructed only with six, five, or four candidate blocks.

As described above, in case a set of common merging candidate blocks is constructed, a block having motion parameter similar to that of a current block (prediction unit) is selected from among the merging candidate blocks and the selected merging candidate block and the current block are merged into one. Selection of a block having motion parameter similar to that of the current block (prediction unit) is performed if the difference between the motion parameter of the current block (prediction unit) and that of each of merging candidate blocks from the set of merging candidate blocks is smaller than a predetermined threshold value.

The same motion parameter is applied to the current block and the selected merging candidate block and the same motion parameter is transmitted to a decoder.

In case the current block is merged with the selected merging candidate block, information of the merged block is transmitted to the decoder without transmitting motion parameter of the current block to the decoder and the decoder can decode the current block by using the information of the merged block and the motion parameter of already-decoded merged block.

As described in the example embodiment above, in case the first PU0 and the second prediction unit PU1 include adjacent blocks of the first PU0 and the second prediction unit PU1 as spatial merging candidate blocks, the first PU0 and the second prediction unit PU1 can include common spatial merging candidate blocks for all the possible partition types irrespective of a partition type and indices of a coding unit having a predetermined size.

In the previous example embodiment, described was an example where the list of common merging candidate blocks includes spatial merging candidate blocks comprised of adjacent blocks of the first PU0 and the second prediction unit PU1; in another example embodiment of the present invention, temporal merging candidate block may be further incorporated into the list of common merging candidate blocks.

In case the first PU0 and the second prediction unit PU1 include temporal merging candidate block as common merging candidate block, the first PU0 and the second prediction unit PU1 of a coding unit (CU) may use a reference picture index of a block, at a predetermined particular position, among the spatial common merging candidate blocks as a reference picture index for temporal motion vector prediction (MVP) of temporal merging candidate block. Here, in case of temporal motion vector prediction, a motion vector and a reference picture index are transmitted to the decoder. Here, the block at the predetermined particular position can be rendered executable through parallel processing by using previously encoded adjacent blocks which can be constructed even before reconstructing motion parameters of a first PU0 and a second prediction unit PU1 from among blocks included in the list of common merging candidate blocks.

Also, the temporal merging candidate block may further be included co-located block, which is included in the previous picture of a current picture and corresponds to a current prediction unit (PU), in the list of common merging candidate list.

Figure 9:
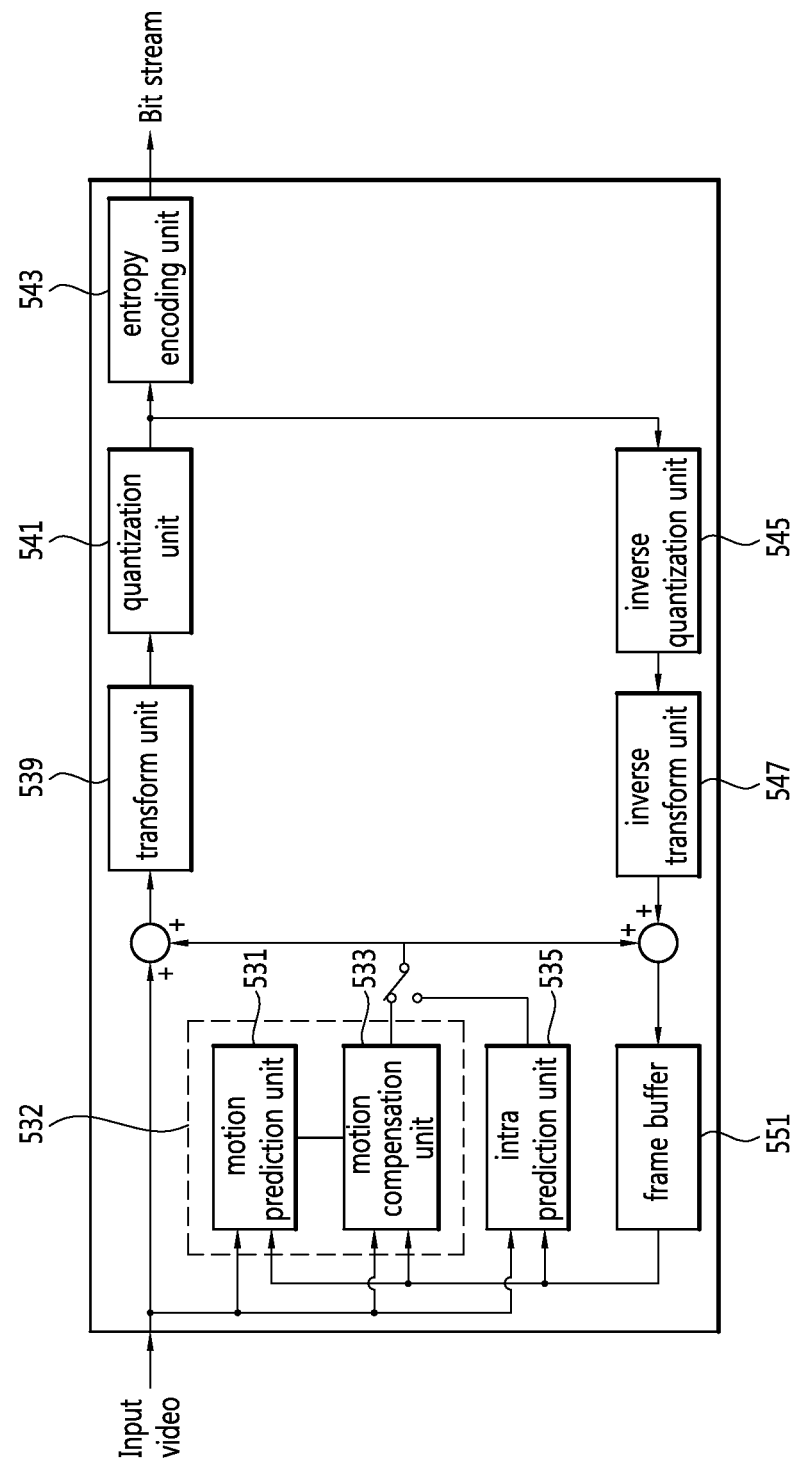
FIG. 9 is a block diagram of a video encoding apparatus using block merging according to one example embodiment of the present invention.

FIG. 9 is a block diagram of a video encoding apparatus using block merging according to one example embodiment of the present invention.

With reference to FIG. 9, a video encoding apparatus includes a encoder 530 and the encoder 530 includes an inter prediction unit 532, an intra prediction unit 535, a subtractor 537, a transform unit 539, a quantization unit 541, an entropy encoding unit 543, an inverse quantization unit 545, an inverse transform unit 547, an adder 549, and a frame buffer 551. The inter prediction unit 532 includes a motion prediction unit 531 and a motion compensation unit 533.

The encoder 530 performs encoding of an input video. The input video can be used on a prediction unit (PU) basis for inter prediction in the inter prediction unit 532 or intra prediction in the intra prediction unit 535.

The encoder 530 performs encoding for prediction units.

The inter prediction unit 532 splits a currently provided prediction unit to be encoded into partitions by using a partitioning method and generates a motion vector by estimating the motion on a partitioned block basis.

The motion prediction unit 531 splits a currently provided prediction unit to be encoded into partitions by using a partitioning method and for each partitioned block, a motion vector is generated on a block basis by searching at least one reference picture (which is stored in a frame buffer after encoding is completed) located before and/or after a current encoding picture for a region similar to a current encoding partitioned block. Here, size of a block used for the motion estimation can be varied.

The motion compensation unit 533 generates a prediction block (or predicted prediction unit) obtained by executing motion compensation by using a motion vector generated from the motion prediction unit 531 and the reference picture.

The inter prediction unit 532 obtains motion parameters for each merged block by carrying out the block merging described above.

In other words, the inter prediction unit 532 constructs a list of common merging candidate blocks including a predetermined number of common merging candidate blocks selected from among blocks adjacent to a current coding unit asymmetrically partitioned into a first and a second prediction unit as described above; and selects at least one candidate block from the list of common merging candidate blocks for each of the first and the second prediction unit.

The inter prediction unit 532 obtains motion parameters of blocks merged with the current coding unit by using the at least one common merging candidate block selected. Motion parameters for each block merged by carrying out the block merging above are transmitted to the decoder.

The intra prediction unit 535 performs intra prediction encoding by using pixel correlation between blocks. The intra prediction unit 535 performs intra prediction which obtains a prediction block of a current prediction unit by predicting pixel values from pre-encoded pixel values of a block within a current frame (or picture).

The subtractor 537 generates residues from a prediction block (or predicted prediction unit) provided by the motion compensation unit 533 by subtracting the current block (or current prediction unit); the transform unit 539 and the quantization unit 541 apply DCT (Discrete Cosine Transform) to the residues and quantize the transformed residues. Here, the transform unit 539 can carry out transformation based on information about size of a prediction unit; for example, the transform unit 539 can carry out transformation by using a maximum of 32×32 or 64×64 pixel block. Also, the transform unit 539 can perform transformation on a particular transform unit(TU) basis independent of the prediction unit size information provided from the prediction unit determination unit 510. For example, the transform unit (TU) may take a minimum of 4×4 pixel block to a maximum of 32×32 pixel block. Also, the maximum size of the transform unit (TU) may exceed a 32×32 pixel block—for example, a 64×64 pixel block. The transform unit size information may be included in information about a transform unit and thus transmitted to the decoder.

The entropy encoding unit 543 generates a bit stream by applying entropy encoding to header information including quantized DCT coefficients, motion vector, determined prediction unit information, partition information, transform unit information, and so on.

The inverse quantization unit 545 inversely quantizes the data quantized through the quantization unit 541 and the inverse transform unit 547 inversely transforms the inversely quantized data. The adder 549 reconstructs a video by adding the inversely transformed data and a predicted prediction unit provided by the motion compensation unit 533 and provides the reconstructed video to the frame buffer 551; the frame buffer 551 stores the reconstructed video.

Figure 10:
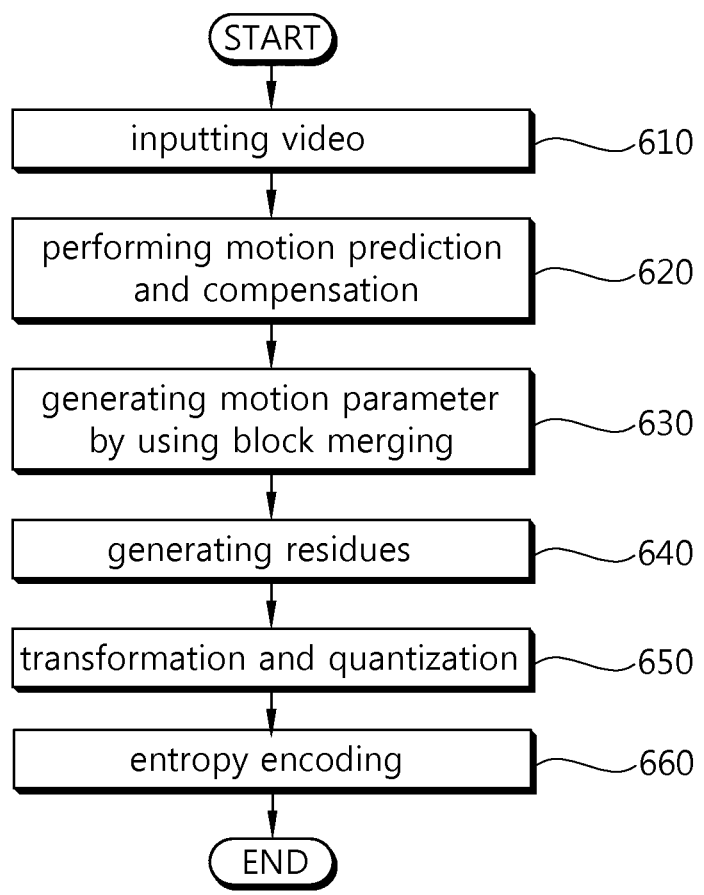
FIG. 10 is a flow diagram illustrating a video encoding method using block merging according to one example embodiment of the present invention.

FIG. 10 is a flow diagram illustrating a video encoding method using block merging according to one example embodiment of the present invention.

With reference to FIG. 10, first, if a input video is provided to an encoding apparatus (Step 610), coding units of the input video are split into partitions by using a partitioning method; for each partitioned block, a motion vector is generated on a block basis by searching at least one reference picture (which is stored in the frame buffer 551 after encoding is completed) located before and/or after a current encoding picture for a region similar to a current encoding partitioned block; prediction blocks (or predicted prediction units) are generated by carrying out motion compensation by using the generated motion vector and the reference picture(Step 620).

Next, the encoding apparatus generates motion parameters for each of merged blocks by carrying out block merging described above for the partitioned prediction units (PUs) (Step 630). Motion parameters for the respective blocks merged by carrying out the block merging described above are transmitted to the decoder.

The encoding apparatus obtains a difference between a current prediction unit and the predicted prediction unit and generates residues (Step 640).

Next, the encoding apparatus transforms the generated residues and quantizes the transformed residues (Step 650); a bit stream is generated by applying entropy encoding to the header information including quantized DCT coefficients, motion parameters, and so on. (Step 660).

A video encoding apparatus and a video encoding method by using block merging according to example embodiments of the present invention transmits motion parameter only once for the whole blocks merged by block merging rather than transmit respective motion parameter for each of asymmetrically partitioned blocks (prediction units). In this way, since the amount of transmission for motion parameters is reduced, encoding efficiency of video having resolution more than HD or UHD (Ultra High Definition) resolution can be improved.

A video decoding apparatus and a video decoding method by using block merging according to example embodiments of the present invention reconstructs a motion vector of a block-merged block by using motion parameter of the block-merged block transmitted from the encoding apparatus described above; a motion prediction unit generates a motion vector on a block basis and the motion compensation unit performs motion compensation by using the motion vector generated by the motion prediction unit and a reference picture.

The video decoding apparatus includes a decoder and the decoder includes an inter prediction unit and an intra prediction unit. The remaining components of the decoder are well-known to the public; therefore, detailed description thereof will be omitted. The inter prediction unit includes a motion prediction unit and a motion compensation unit.

In the same way as the encoding apparatus, the inter prediction unit constructs a list of common merging candidate blocks including a predetermined number of common merging candidate blocks selected from blocks adjacent to a current coding unit, which have been asymmetrically partitioned into a first and a second prediction unit, the inter prediction unit generates a motion vector on a block basis by reconstructing motion parameters of a block-merged block by using at least one candidate block selected from the list of common merging candidate blocks for each of the first and the second prediction unit, and the inter prediction unit performs motion compensation by using the generated motion vector and a reference picture.

In case of a video decoding apparatus and a video decoding method which uses the block merging, size of a coding unit (CU) is 2N×2N (where N is a positive integer) and N can be one of 2, 4, 8, 16, and 32. A technique of utilizing common merging candidate blocks to enable parallel processing of asymmetrically partitioned prediction units PU0 and PU1 can be applied to all of coding units where N can take a value from among 2, 4, 8, 16, and 32 or can be applied to the coding units where N can assume only one particular value—for example, one from among 2, 4, 8, 15, and 32. In case the largest coding unit (LCU) is 64×64, the smaller the size of the coding unit (CU), the larger becomes the number of constructing a list of common merging blocks including common merging candidate blocks for the entire 64×64 block; in this case, if the common merging candidate list is applied for the case where size of the coding unit (CU) is small rather than the case where size of the coding unit (CU) is large, the number of constructing the common merging candidate list can be significantly reduced, thereby reducing complexity. Meanwhile, if parallel processing is performed by applying much more of the common merging list, performance loss becomes large. Therefore, by taking account both of performance loss and complexity, if the minimum size of a prediction unit (PU) is 4×4, for example, complexity can be reduced a lot without sacrificing performance significantly by employing the common merging candidate blocks only for the case where size of the coding unit (CU) is 8×8 (the smallest number 4 excluding 2 is selected from the N values of 2, 4, 8, 16, and 32).

Meanwhile, the largest coding unit (LCU) can be split into a plurality of non-overlapping motion estimation regions (or merge estimation regions); motion estimation can be made to be performed sequentially among motion estimation regions within the largest coding unit (LCU) whereas all the prediction units (PUs) belonging to one motion estimation region within the largest coding unit (LCU) can be made to perform motion estimation in a parallel fashion. For example, size of the motion estimation region may be smaller than that of the LCU and the motion estimation region can have a square shape.

Depending on size of a motion estimation region, it is determined whether to allow parallel processing of prediction units (PUs) within the motion estimation region by using common merging candidate blocks. For example, suppose size of the smallest prediction unit is 4×4. If size of the motion estimation region is 4×4, a sequential merging operation is applied to all the prediction units within the largest coding unit (LCU). Meanwhile, it can be made such that parallel merging—a technique using common merging candidate blocks to enable parallel processing—is allowed for all the prediction units (PUs) within the motion estimation region only when the size of the motion estimation region is 8×8 or more.

If a current prediction unit (PU) and an adjacent prediction unit (PU) belong to the same motion estimation region (in other words, within the same motion estimation region), the corresponding adjacent prediction unit is marked as non-available whereas the current prediction unit and the adjacent prediction unit belong to motion estimation regions different from each other, the corresponding adjacent prediction unit is marked as available; thus, availability of the list of common merging candidate blocks for motion vector estimation can be determined. In case part of common merging candidate blocks adjacent to a current coding unit (CU) having size of 8×8 (adjacent prediction units) is not available, the merging operation described above can be performed by using adjacent common merging candidate blocks available.

As described in the encoding apparatus above, in case the first PU0 and the second prediction unit PU1 include adjacent blocks of the first PU0 and the second prediction unit PU1 as spatial merging candidate blocks, the first PU0 and the second prediction unit PU1 can include common spatial merging candidate blocks for all the possible partition types irrespective of a partition type and indices of a coding unit having a predetermined size.

In the same way as the encoding apparatus, the list of common merging candidate blocks includes spatial merging candidate blocks comprised of adjacent blocks of the first PU0 and the second prediction unit PU1. in addition, temporal merging candidate block may be further incorporated into the list of common merging candidate blocks.

In case the first PU0 and the second prediction unit PU1 include temporal merging candidate block as common merging candidate blocks, the first PU0 and the second prediction unit PU1 of a coding unit (CU) may use a reference picture index of a block, at a predetermined particular position, among the spatial common merging candidate blocks as a reference picture index for temporal motion vector prediction (MVP) of temporal merging candidate blocks. Here, the block at the predetermined particular position can be rendered executable through parallel processing by using previously encoded adjacent blocks which can be constructed even before reconstructing motion parameters of a first PU0 and a second prediction unit PU1 from among blocks included in the list of common merging candidate blocks.

According to methods for encoding/decoding of a video by using block merging as described above, a current block is asymmetrically partitioned to generate a first and a second prediction unit. For each of the first and the second prediction unit, motion parameter(s) are not transmitted but a list of common merging candidate blocks including a predetermined number of common merging candidate blocks selected from blocks adjacent to the current block is constructed. At least one common merging candidate block selected from among common merging candidate blocks belonging to the list of common merging candidate blocks transmits motion parameter(s) only once for the current block and the whole blocks merged. In this way, since the amount of transmission of side information such as the motion parameter is reduced, encoding efficiency of a video of more than HD or UHD (Ultra High Definition) resolution can be improved.

A first process constructing a list of merging candidate blocks for block merging of a first prediction unit PU0 generated from asymmetric partition and a second process constructing a list of merging candidate blocks for block merging of a second prediction unit PU1 are not performed separately but can be performed in the form of a single process constituting the common merging candidate block. Since an encoding (or decoding) process for the second prediction unit PU1 can be performed in parallel with an encoding (or decoding) process for the first prediction unit PU0, encoding time can be reduced considerably.

What is claimed is:

1. A video decoding method, comprising:
constructing a list of common merging candidate blocks by including a predetermined number of the common merging candidate blocks selected from among adjacent blocks of a current coding unit, the current coding unit partitioned into a first prediction unit and a second prediction unit;
generating a motion vector by reconstructing a motion parameter of a block-merged block by using at least one common merging candidate block selected from the list of common merging candidate blocks for each of the first prediction unit and the second prediction unit; and
performing motion compensation by using the generated motion vector and a reference picture,
wherein the constructing of the list of common merging candidate blocks is performed only when a size of the current coding unit is 8-by-8.

2. The video decoding method of claim 1, wherein the selected at least one common merging candidate block for the second prediction unit comprise adjacent blocks which are constructed even before reconstructing a motion parameter of the first prediction unit.

3. The video decoding method of claim 1, wherein a largest coding unit (LCU) is divided into a plurality of non-overlapping motion estimation regions,
motion estimation is performed sequentially on the motion estimation regions within the largest coding unit (LCU), and
the motion estimation is performed in a parallel fashion for the first prediction unit and the second prediction unit belonging to a motion estimation region within the largest coding unit (LCU).

4. The video decoding method of claim 3, wherein whether to allow a parallel merging for the first prediction unit and the second prediction unit within the same motion estimation region by using the common merging candidate blocks is determined according to a size of the motion estimation region.

5. The video decoding method of claim 4, wherein the parallel merging for the first prediction unit and the second prediction unit within the same motion estimation region is allowed only when the size of the motion estimation region is larger than a predetermined size.

6. The video decoding method of claim 4, wherein
in case the current prediction unit and another prediction unit adjacent to the current prediction unit belong to the same motion estimation region, said another prediction unit is denoted as non-available, and
in case the current prediction unit and said another prediction unit adjacent to the current prediction unit belong to motion estimation regions different from each other, said another prediction unit is denoted as available.

7. The video decoding method of claim 1, wherein the list of common merging candidate blocks includes a spatial merging candidate block and a temporal merging candidate block.

8. The video decoding method of claim 1, wherein the first prediction unit and the second prediction unit within the current coding unit utilize a reference picture index of a block, at a predetermined particular position, from among spatial common merging candidate blocks as a reference picture index for temporal motion vector prediction (MVP) of a temporal merging candidate block.

9. The video decoding method of claim 8, wherein the block, at the predetermined particular position, uses a previously encoded adjacent block which is constructed before reconstructing a motion parameter of a first prediction unit and a second prediction unit from among blocks included in the list of common merging candidate blocks.

* * * * *